(12) United States Patent
Kim et al.

(10) Patent No.: US 12,447,968 B2
(45) Date of Patent: Oct. 21, 2025

(54) VEHICLE CONTROL APPARATUS AND METHOD

(71) Applicants: HYUNDAI MOTOR COMPANY, Seoul (KR); KIA CORPORATION, Seoul (KR)

(72) Inventors: Sung Kwan Kim, Incheon (KR); Su Jin Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 98 days.

(21) Appl. No.: 18/514,616

(22) Filed: Nov. 20, 2023

(65) Prior Publication Data

US 2024/0383477 A1 Nov. 21, 2024

(30) Foreign Application Priority Data

May 16, 2023 (KR) .......................... 10-2023-0063240

(51) Int. Cl.
*B60W 30/18* (2012.01)
*G06V 20/56* (2022.01)

(52) U.S. Cl.
CPC ..... *B60W 30/18163* (2013.01); *G06V 20/588* (2022.01); *B60W 2420/403* (2013.01); *B60W 2540/18* (2013.01); *B60W 2540/215* (2020.02); *B60W 2552/53* (2020.02)

(58) Field of Classification Search
CPC ..... B60W 30/18163; B60W 2420/403; B60W 2420/90; B60W 2540/18; B60W 2540/215; B60W 2552/53; B60W 60/0013; B60W 40/02; B60W 2050/0088; B60W 2520/06; G06V 20/588
USPC ........................................ 701/41, 42, 43, 44
See application file for complete search history.

(56) References Cited

FOREIGN PATENT DOCUMENTS

| CN | 115140094 A | * | 10/2022 | ...... B60W 30/18163 |
| DE | 102017129366 A1 | * | 6/2018 | ............. B60Q 1/346 |
| JP | 2007261449 A | * | 10/2007 | ............. B60W 30/12 |
| RU | 2685108 C1 | * | 4/2019 | ............. B60W 10/20 |

* cited by examiner

*Primary Examiner* — Hai H Huynh
(74) *Attorney, Agent, or Firm* — Lempia Summerfield Katz LLC (57) ABSTRACT

A vehicle control apparatus includes one or more sensors that obtain information related to a vehicle being driven within a driving lane. The vehicle control apparatus further includes a processor that sets a lane change start target point with respect to a center of the driving lane. The processor sets at least one new lane change start target point based on a position of the vehicle if it is determined that a center of a bumper of the vehicle is biased in one direction with respect to the center of the driving lane.

18 Claims, 8 Drawing Sheets

VEHICLE CONTROL APPARATUS AND METHOD

CROSS-REFERENCE TO RELATED APPLICATION

This application claims the benefit of priority to Korean Patent Application No. 10-2023-0063240, filed in the Korean Intellectual Property Office on May 16, 2023, the entire contents of which are incorporated herein by reference.

TECHNICAL FIELD

The present disclosure relates to a vehicle control apparatus and method.

BACKGROUND

In a lane change situation, an autonomous vehicle may set a lane change start target point at the center of a driving lane. The autonomous vehicle may set a lane change end target point at the center of a lane change target lane. The autonomous vehicle may be controlled to be autonomously driven to start a lane change at the lane change start target point and follow the lane change end target point.

In general, when a nearby object approaches or a passenger wants to get in or out of the vehicle, a situation may occur in which driving the vehicle is biased in, i.e., the vehicle is deflected to, the vehicle is driven toward, or the vehicle deviates to, a direction away from the center of the driving lane. In this situation, when a lane change is required, additional steering is applied to the vehicle to start a lane change at a lane change start target point set in the center of the driving lane.

However, when the degree of bias, i.e., the degree of deviation, from the center of the driving lane to one side is large, the steering angle required for additional steering also increases. Therefore, an occupant may feel uncomfortable or anxious due to the difference in motion when steering of the vehicle is performed at a suddenly-increased steering angle.

SUMMARY

The present disclosure has been made to solve the above-mentioned problems occurring in the prior art while advantages achieved by the prior art are maintained intact.

Aspects of the present disclosure provide a vehicle control apparatus and method for controlling a lane change without causing an occupant to feel a sense of difference in motion when the vehicle is biased in one direction from the center of a lane where an autonomous vehicle is located in a lane change situation.

Aspects of the present disclosure provide a vehicle control apparatus and method for resetting a lane change start target point based on the degree of bias in one direction from the center of a lane where a vehicle is located being greater than or equal to a reference value.

Aspects of the present disclosure provide a vehicle control apparatus and method for resetting a lane change start target point such that an entry angle is less than a pre-stored angle when an entry angle at which the autonomous vehicle enters a lane change start target point, which is set when the autonomous vehicle is located in the center of the lane, is greater than the pre-stored angle.

Aspects of the present disclosure provide a vehicle control apparatus and method for resetting a lane change start target point based on an intersection point where a reference line connecting a lane change start target point and a lane change end target point generated based on the center of an autonomous vehicle and the center of a lane meet.

Aspects of the present disclosure provide a vehicle control apparatus and method for controlling a lane change by selecting a lane change start target point having the smallest change in steering angle when moving to a reset lane change start target point.

The technical problems to be solved by the present disclosure are not limited to the aforementioned problems. Any other technical problems not mentioned herein should be more clearly understood from the description by those of ordinary skill in the art to which the present disclosure pertains.

According to an aspect of the present disclosure, a vehicle control apparatus includes one or more sensors that obtain information related to a vehicle being driven within a driving lane. The apparatus further includes a processor that sets a lane change start target point with respect to a center of the driving lane and sets at least one new lane change start target point based on a position of the vehicle if it is determined that a center of the vehicle is biased in one direction with respect to the center of the driving lane.

In an embodiment, the processor may determine a first distance from the center of the driving lane to one end of the driving lane and a second distance from the center of the driving lane to the center of the vehicle. The processor may determine a ratio of the second distance to the first distance as a bias degree. The processor may set a point biased from the center of the driving lane based on the second distance and the bias degree, as the at least one new lane change start target point.

In an embodiment, the processor may determine an angle between a line connecting the center of the vehicle and the lane change start target point and an imaginary line set at the center of the driving lane, as an entry angle. If the entry angle is greater than or equal to a pre-stored angle, the processor may set the at least one new lane change start target point by moving the lane change start target point along the imaginary line such that the entry angle is less than the pre-stored angle.

In an embodiment, the processor may set an intersection point where a reference line connecting the lane change start target point, which is set based on the center of the vehicle and a lane change end target point, and the center of the driving lane meet, as the at least one new lane change start target point.

In an embodiment, the processor may select another at least one new lane change start target point having a smallest change in steering angle if the vehicle moves to the at least one new lane change start target point.

In an embodiment, the processor may control a lane change based on the selected other at least one new lane change start target point.

In an embodiment, the processor may set a lane change end target point at a center of a lane change target lane, generate a lane change path following the lane change end target point from the at least one new lane change start target point, and control a lane change based on the lane change path.

In an embodiment, the processor may perform control to output the at least one new lane change start target point and the lane change path via an output device if the at least one new lane change start target point is set.

In an embodiment, the processor may enable a user or an occupant to select the change lane path from among a plurality of output lane change paths. The processor may control the lane change based on the lane change path selected by the user.

According to an aspect of the present disclosure, a vehicle control method includes setting a lane change start target point with respect to a center of the driving lane. The method further includes setting at least one new lane change start target point based on a position of the vehicle if it is determined that a center of a vehicle is biased in one direction with respect to the center of the driving lane.

In an embodiment, the vehicle control method may further include determining a first distance from the center of the driving lane to one end of the driving lane and a second distance from the center of the driving lane to the center of the vehicle. The method may further include determining a ratio of the second distance to the first distance as a bias degree. The method may further include setting a point biased from the center of the driving lane based on the second distance and the bias degree, as the at least one new lane change start target point.

In an embodiment, the vehicle control method may further include determining an angle between a line connecting the center of the vehicle and the lane change start target point and an imaginary line set at the center of the driving lane, as an entry angle. The method may further include, if the entry angle is greater than or equal to a pre-stored angle, setting the at least one new lane change start target point by moving the lane change start target point along the imaginary line such that the entry angle is less than the pre-stored angle.

In an embodiment, the vehicle control method may further include setting an intersection point where a reference line connecting the lane change start target point, which is set based on the center of the vehicle and a lane change end target point, and the center of the driving lane meet, as the at least one new lane change start target point.

In an embodiment, the vehicle control method may further include selecting another at least one new lane change start target point having a smallest change in steering angle if the vehicle moves to the at least one new lane change start target point.

In an embodiment, the vehicle control method may further include controlling a lane change based on the selected at least one new lane change start target point.

In an embodiment, the vehicle control method may further include setting a lane change end target point at a center of a lane change target lane, generating a lane change path following the lane change end target point from the at least one new lane change start target point, and controlling a lane change based on the lane change path.

In an embodiment, the vehicle control method may further include performing control to output the at least one new lane change start target point and the lane change path via an output device if the new lane change start target point is set.

In an embodiment, the vehicle control method may further include enabling a user to select the lane change path from among a plurality of output lane change paths. The method may further include controlling the lane change based on the lane change path selected by the user.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Various embodiments of the present disclosure are described in detail with reference to the drawings. In adding the reference numerals to the components of each drawing, it should be noted that identical or equivalent components are designated by the identical numerals even when they are displayed on different drawings. Further, in describing the embodiments of the present disclosure, a detailed description of well-known features or functions have been ruled out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component. The terms do not limit the nature, sequence, or order of the constituent components. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings consistent with the contextual meanings in the relevant field of art. Such terms should not to be interpreted as having ideal or excessively formal meanings unless clearly defined as having such in the present application.

Figure 1:
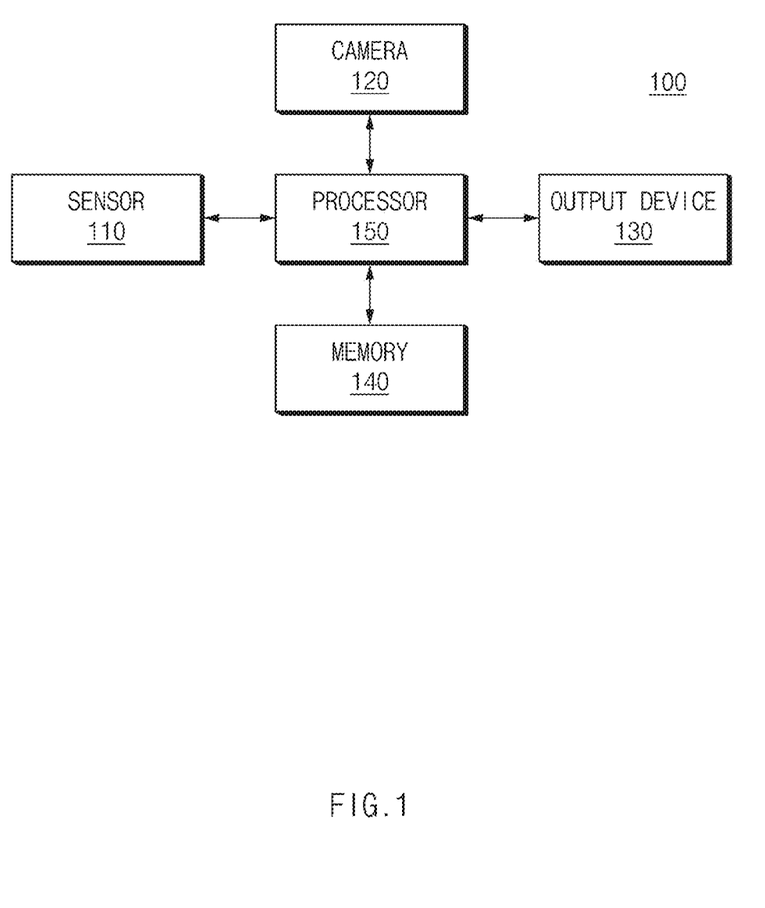
FIG. 1 is a diagram illustrating a configuration of a vehicle control apparatus according to an embodiment of the present disclosure.

FIG. 1 is a diagram illustrating a configuration of a vehicle control apparatus according to an embodiment of the present disclosure. When a component, device, element, or the like of the present disclosure is described as having a purpose or performing an operation, function, or the like, the component, device, or element should be considered herein as being "configured to" meet that purpose or to perform that operation or function.

Referring to FIG. 1, a vehicle control apparatus 100 may include a sensor 110, a camera 120, an output device 130, a non-transitory memory 140, and a processor 150.

The sensor 110 may obtain information related to a vehicle being driven within a driving lane. According to an embodiment, the information related to vehicle driving, i.e., the vehicle being driven, may include at least one of surrounding images representing, for example, objects surrounding, i.e., around, nearby, in the vicinity of, or the like, the vehicle acquired in real time while the vehicle is being driven, state information of the vehicle, or any combination thereof. According to an embodiment, the sensor 110 may include an image sensor, an ultrasonic sensor, LiDAR, radar, and the like. The sensor 110 may detect an object outside the vehicle, for example, a preceding vehicle driving ahead the vehicle, a road, a stationary object including a structure installed around the road, and a vehicle approaching from the opposite lane. The sensor 110 according to a disclosed embodiment may detect data including information regarding the ground of a road or lane information by detecting lane markings on the road or signals reflected from the ground of the road. In addition, the sensor 110 may include a steering wheel sensor and detect a change in the steering angle of a steering wheel.

The camera 120 may obtain surrounding images of the vehicle. According to an embodiment, the camera 120 may obtain images of a preceding vehicle driving ahead of the vehicle, a road, a stationary object including a structure installed around the road, a vehicle approaching from the opposite lane, and the like, and obtain an image including information regarding the ground of the road or lane information.

The output device 130 may output images or sounds under the control of the processor 150. According to an embodiment, the output device 130 may be implemented with a display device or a sound output device. In this case, the display device may include a navigation display, a head-up display (HUD), a cluster, and the like.

The memory 140 may store at least one or more algorithms for performing operations or execution of various commands for the operation of the vehicle control apparatus according to an embodiment of the present disclosure. According to an embodiment, the memory 140 may store at least one instruction to be executed by the processor 150. The at least one instruction may cause the vehicle control apparatus of the present disclosure to operate. The memory 140 may include at least one medium of a flash memory, a hard disk, a memory card, a Read-Only Memory (ROM), a Random Access Memory (RAM), an Electrically Erasable Programmable Read-Only Memory (EEPROM) Memory, a Programmable Read-Only Memory (PROM), a magnetic memory, a magnetic disk, and an optical disk.

The processor 150 may be implemented by various processing devices incorporating a semiconductor chip capable of operating or executing various instructions or the like. The processor 150 may control an operation of the vehicle control apparatus according to an embodiment of the present disclosure. The processor 150 may be electrically connected to the sensor 110, the camera 120, the output device 130, and the memory 140 through wire cables or various circuits to transmit electrical signals including control commands. The processor 150 may perform calculations or data processing related to control and/or communication. The processor 150 may include one or more of a central processing unit, an application processor, or a communication processor (CP).

According to an embodiment of the present disclosure, when it is determined, i.e., when the processor 150 determines or upon the processor 150 determining, that the center of the bumper of the vehicle is biased in, i.e., is deflected to, leans towards, tends to go in, or deviates toward, one direction with respect to the center of the driving lane in which a lane change start target point is set, the processor 150 may set at least one new lane change start target point based on the vehicle location. The processor 150 may further control the lane change based on the new lane change start target point. A vehicle according to an embodiment of the present disclosure may include an autonomous vehicle. In this regard, a detailed description is given below with reference to FIGS. 2-6.

FIGS. 2-6 are diagrams schematically showing a method of setting a lane change start target point according to an embodiment of the present disclosure.

Figure 2:
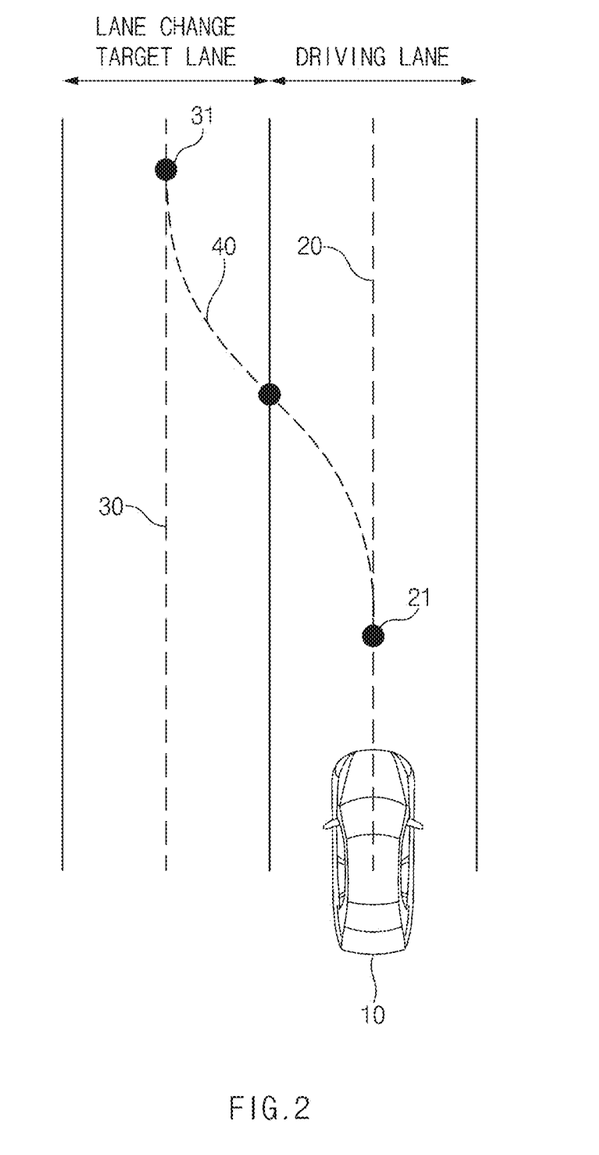
FIGS. 2-6 are diagrams schematically showing a method of setting a lane change start target point according to an embodiment of the present disclosure.

Referring to FIG. 2, the processor 150 may set a first imaginary line 20 at the center of a driving lane of a vehicle and a second imaginary line 30 at the center of a lane change target lane, i.e., a second driving lane. The processor 150 may further set a lane change start target point 21 on the first imaginary line 20 and a lane change end target point 31 on the second imaginary line 30. In addition, when the first imaginary line 20 coincides with the center of the bumper of the vehicle 10, the processor 150 may generate a lane change path 40 such that the vehicle 10 performs a lane change by following the lane change end target point 31 from the lane change start target point 21.

Figure 3:
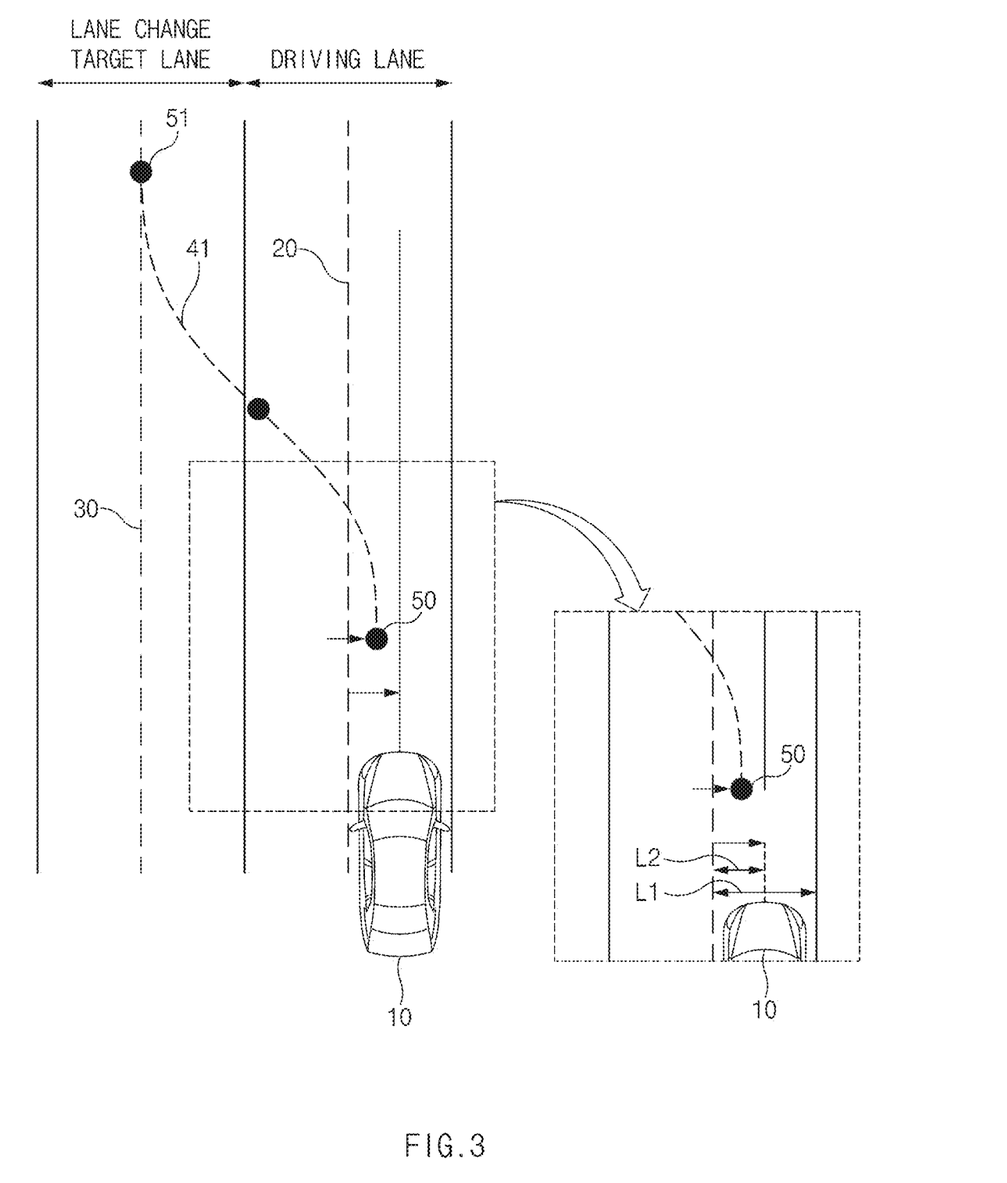

As shown in FIG. 3, the processor 150 may set the first imaginary line 20 at the center of a driving lane of the vehicle and the second imaginary line 30 at the center of a lane change target lane. The processor 150 may set the lane change end target point 31 on the second imaginary line 30.

When the processor 150 determines that the center of the bumper of the vehicle 10 is biased in one direction with respect to the first imaginary line 20 in which the lane change start target point 21 (FIG. 2) is set, the processor 150 may calculate a bias degree, i.e., a deviation degree, and set a new lane change start target point based on the bias degree. According to an embodiment, the processor 150 may calculate a first distance L1 from the first imaginary line 20 of the driving lane to one end of the driving lane, calculate a second distance L2 from the first in imaginary line 20 to the center of the bumper of the vehicle 10, and calculate a ratio of the second distance to the first distance as a bias degree. According to an embodiment, the bias degree may be calculated using Equation 1.

$$\text{Bias degree} = L2/L1 \qquad \text{<Equation 1>}$$

The processor 150 may determine whether the bias degree is greater than or equal to a reference value.

According to an embodiment, when the processor 150 determines that the bias degree is not greater than or equal to (or less than) the reference value, the processor 150 may determine that the bias degree of the center of the bumper of the vehicle 10 in one direction is insufficient with respect to the first imaginary line 20 on which the lane change start target point is set and a user, i.e., an occupant of the vehicle, would not feel a difference when the steering is performed at the current vehicle position to start a lane change at the lane change start target point 21 shown in FIG. 2 and when the steering is performed at the current vehicle position to start the lane change at a new lane change start target point 50 of FIG. 3. In this embodiment, the processor 150 performs control of the vehicle 10 so that the lane change is controlled at the preset lane change start target point 21 without setting a new lane change start target point for the lane change. According to an embodiment of the present disclosure, a threshold value for the amount of change in the steering angle at which the user feels a change in steering may be stored. The processor 150 may determine that the user feels a change in steering when the threshold value for the amount of change in the steering angle is greater than the threshold value. The processor 150 may determine that the user does not feel a change in steering when the threshold value for the amount of change in the steering angle is less than or equal to the threshold value.

According to an embodiment, when the processor 150 determines that the bias degree is greater than the reference value, the processor 150 may determine that the user would feel a difference when the steering of the vehicle 10 is performed to start the lane change at the lane change start target point 21 of FIG. 2 and when the steering of the vehicle 10 is performed to start the lane change at the new lane change start target point 50 shown in FIG. 3. The processor 150 may set a point biased from the center of the driving lane based on a value obtained by multiplying the second distance and the bias degree from the first imaginary line 20 of the driving lane as the new lane change start target point 50.

In addition, when the new lane change start target point 50 is set, the processor 150 may set a new lane change end target point 51 on a lane change target lane, and generate a lane change path 41 to perform the lane change while following the new lane change end target point 51 from the new lane change start target point 50. According to an embodiment, when the new lane change start target point 50 is set, the processor 150 may output the new lane change start target point 50 through, i.e., via, the output device 130, and also output the lane change path 41 along with the new lane change start target point 50 through the output device 130.

Figure 4:
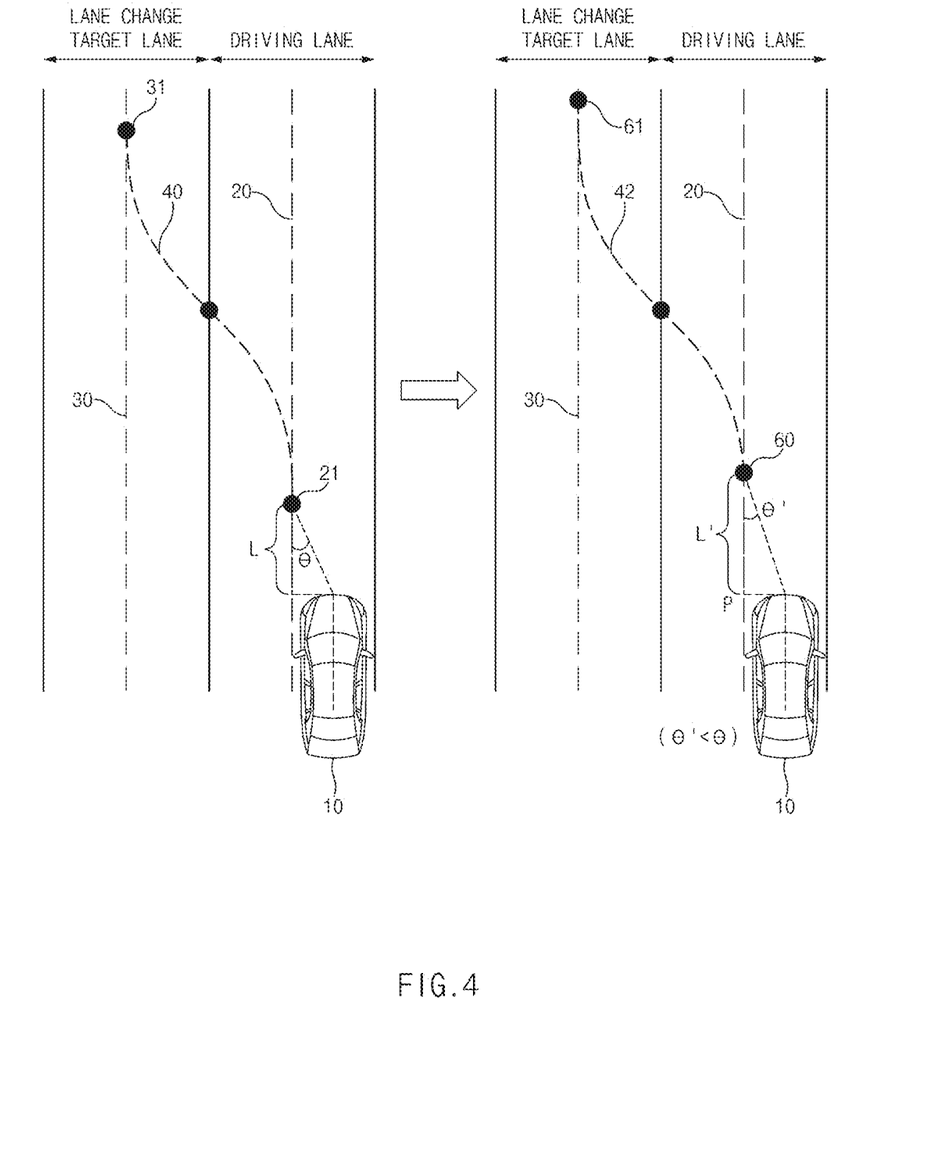

Referring to FIG. 4, the processor 150 may set the first imaginary line 20 at the center of a driving lane of the vehicle and the second imaginary line 30 at the center of a lane change target lane. The processor may set the lane change start target point 21 on the first imaginary line 20 and the lane change end target point 31 on the second imaginary line 30.

The processor 150 may calculate an angle between the first imaginary line 20 and a line connecting the bumper (center of the bumper) of the vehicle 10 and the lane change start target point 21 at the current position as a first entry angle θ.

The processor 150 may determine whether the entry angle θ is equal to or greater than a pre-stored angle. In this embodiment, the pre-stored angle may be set to an angle at which the user feels a sense of difference when the steering of the vehicle 10 is performed to start the lane change at the lane change start target point 21. Accordingly, when the processor 150 determines that the entry angle θ is equal to or greater than the pre-stored angle, the processor 150 may determine that the user may feel a sense of difference when the steering of the vehicle is performed to start the lane change at the lane change start target point 21.

When the entry angle θ is equal to or greater than the pre-stored angle, the processor 150 may move the lane change start target point 21 along the first imaginary line 20 in the driving direction of the vehicle 10 such that the entry angle θ is less than the pre-stored angle and then set a new lane change start target point 60.

According to an embodiment, the processor 150 may set a target entry angle θ' by adjusting a distance (L') between the intersection point (P) of a vertical line drawn down from the bumper of the vehicle 10 to the first imaginary line 20 and the new lane change start target point 60. The processor 150 may perform an operation or may control the vehicle 10 such that the target entry angle θ' is less than the pre-stored angle (e.g., θ'<θ).

In addition, when the new lane change start target point 60 is set, the processor 150 may set a new lane change end target point 61 on a lane change target lane and may generate a lane change path 42 to perform the lane change while following the new lane change end target point 61 from the new lane change start target point 60. According to an embodiment, when the new lane change start target point 60 is set, the processor 150 may output the new lane change start target point 60 through the output device 130 and may also output the lane change path 42 along with the new lane change start target point 60 through the output device 130.

Figure 5:
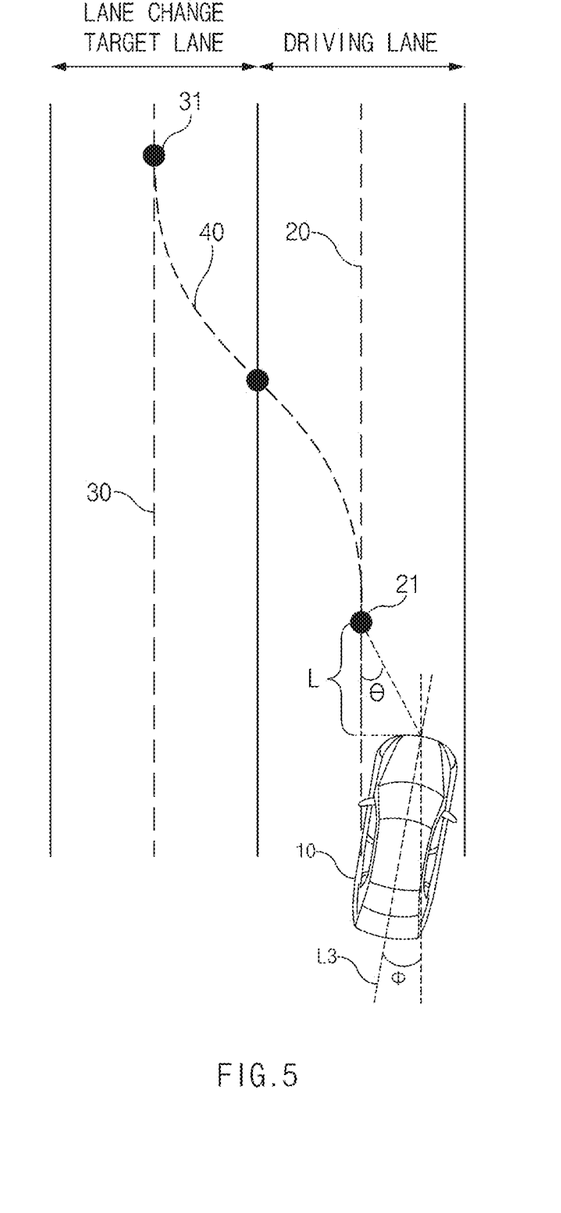

As shown in FIG. 5, when the entry angle θ is less than the pre-stored angle, the processor 150 may start the lane change at the lane change start target point 21. However, because steering is performed based on a predetermined angle (φ), to compensate for the predetermined angle (φ), when it is determined that a line L3 crossing the front and rear bumpers of the vehicle is not parallel to the first imaginary line 20 and is deviated by the predetermined angle (φ), the target steering angle used to start the lane change at the lane change start target point 21 may be set to a value obtained by subtracting the predetermined angle (φ) from the entry angle (θ) (e.g., θ>φ).

Figure 6:
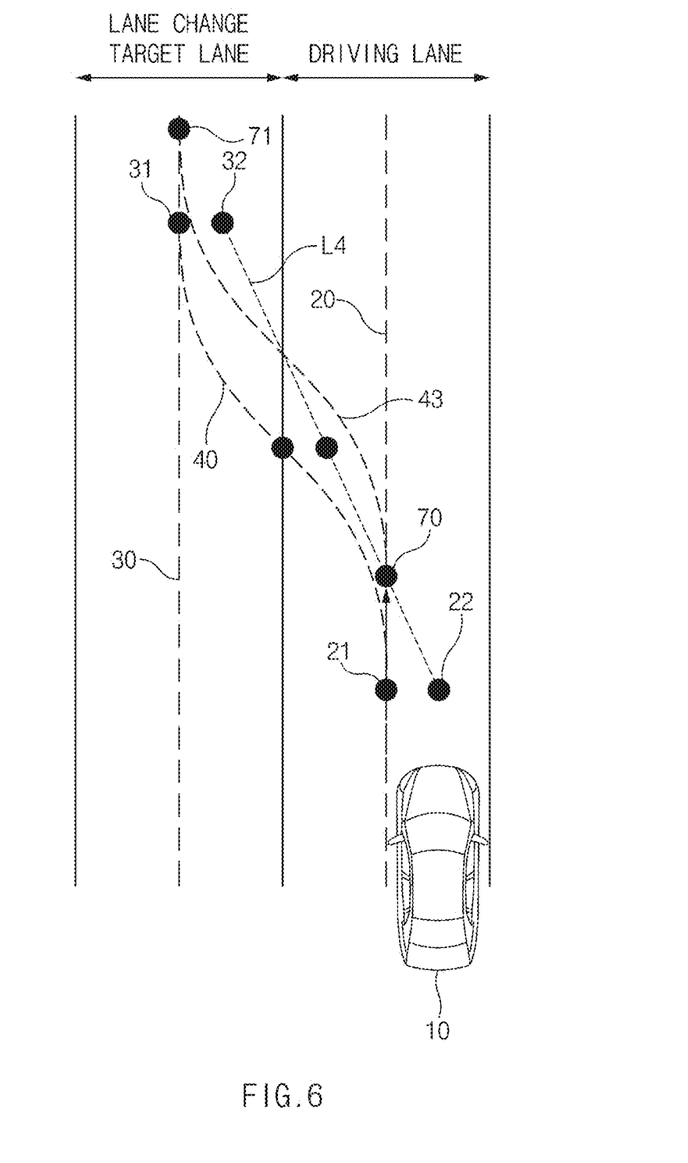

Referring to FIG. 6, the processor 150 may set the first imaginary line 20 at the center of a driving lane of the vehicle and the second imaginary line 30 at the center of a lane change target lane. The processor 150 may set the lane change start target point 21 on the first imaginary line 20 and the lane change end target point 31 on the second imaginary line 30.

The processor 150 may set a lane change start target point 22 and a lane change end target point 32 with respect to the center of the bumper of the vehicle 10 in the same manner as the method of setting a lane change start target point and a lane change end target point by generating a virtual line on the lane. The processor 150 may generate a reference line L4 by connecting the lane change start target point 22 and the lane change end target point 32. The processor 150 may determine whether the distance between an intersection point 70 where the reference line L4 and the first imaginary line 20 meet and the lane change start target point 21 is greater than or equal to a reference distance.

According to an embodiment, when the distance between the lane change start target point 21 and the intersection point 70 is less than the reference distance, the processor 150 may determine that the user would not feel a difference when the steering is performed at the current vehicle position to start the lane change at the lane change start target point 21 and when the steering is performed at the current vehicle position to start the lane change at the intersection point 70. The processor 150 may perform control or control the vehicle 10 such that the lane change is controlled at the preset lane change start target point 21 without setting the intersection point 70 as a new lane change start target point for lane change.

According to an embodiment, when the distance between the lane change start target point 21 and the intersection point 70 is greater than or equal to the reference distance, the processor 150 may determine that the user would feel a difference when the steering is performed at the current vehicle position to start the lane change at the lane change start target point 21 and when the steering is performed at the current vehicle position to start the lane change at the intersection point 70 and set the intersection point 70 as a new lane change start target point for lane change. Hereinafter, the intersection point 70 is referred to as the new lane change start target point 70.

In addition, when the new lane change start target point 70 is set, the processor 150 may set a new lane change end target point 71 on a lane change target lane. The processor may generate a lane change path 43 to perform the lane change while following the new lane change end target point 71 from the new lane change start target point 70. According to an embodiment, when the new lane change start target point 70 is set, the processor 150 may output the new lane change start target point 70 through the output device 130. The processor 150 may also output the lane change path 43 along with the new lane change start target point 60 through the output device 130.

When a new lane change start target point (50 in FIG. 3, 60 in FIG. 4, and 70 in FIG. 6) is set, the processor 150 may output a corresponding lane change path (41 in FIG. 3, 42 in FIG. 4, 43 in FIG. 6) through the output device 130. The processor 150 may also allow, i.e., enable, the user to select a lane change path of a plurality of lane change paths displayed via the output device 130. In addition, when the user selects the lane change path, the processor 150 may control a lane change based on the selected lane change path.

When the processor 150 controls moving the vehicle 10 from the current vehicle position to the new lane change start target point (50 in FIG. 3, 60 in FIG. 4, and 70 in FIG. 6), the processor 150 may select a new lane change start target point having the smallest change in steering angle.

When the new lane change start target point having the smallest change in steering angle is selected, the processor 150 may control a lane change based on the selected new lane change start target point.

Figure 7:
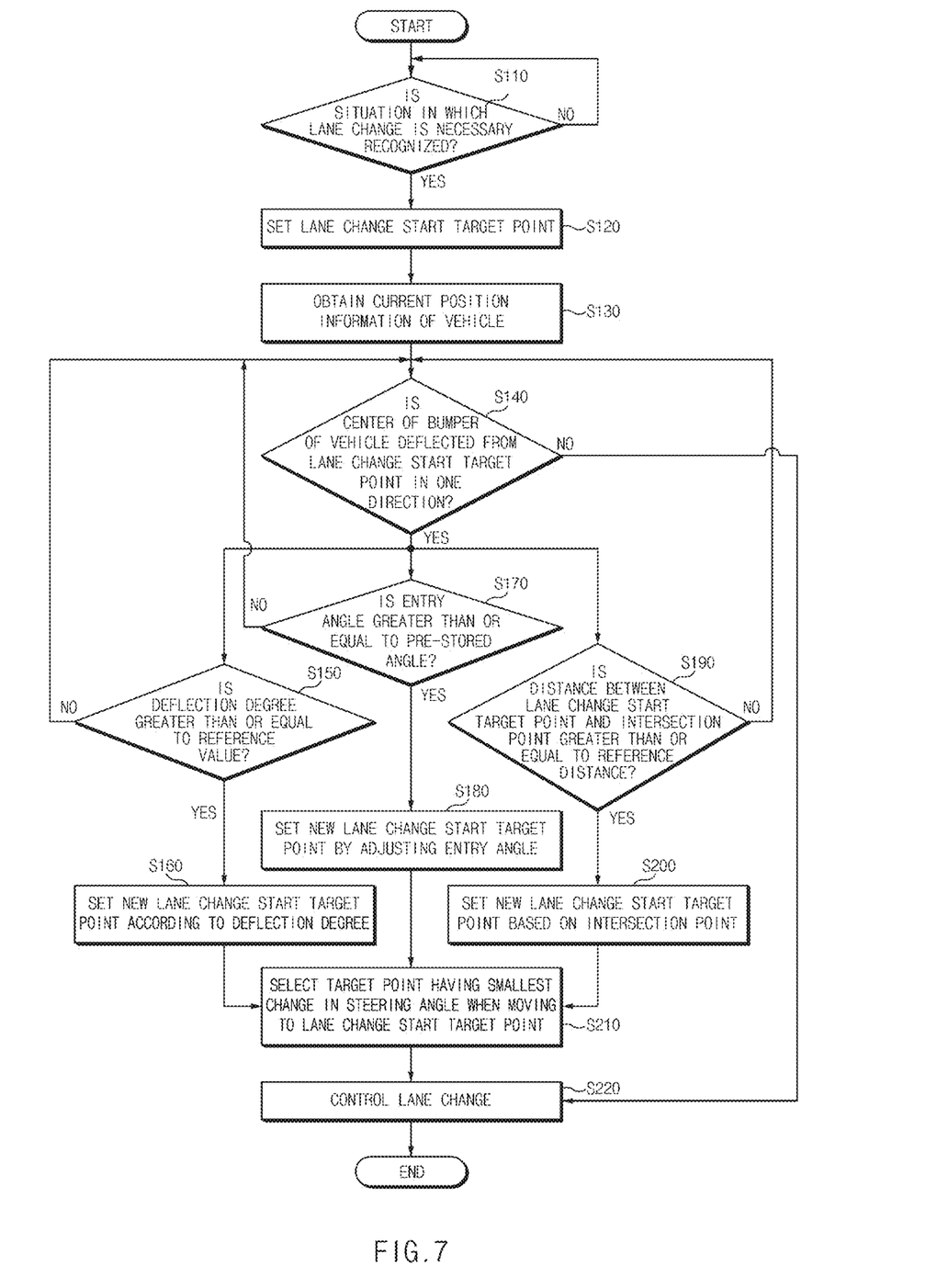
FIG. 7 is a diagram illustrating a vehicle control method according to an embodiment of the present disclosure.

FIG. 7 is a diagram illustrating a vehicle control method according to an embodiment of the present disclosure.

Referring to FIG. 7, the processor 150 may recognize whether a lane change is necessary (S110).

When determining that a lane change is necessary, the processor 150 may set a lane change start target point (S120).

In the embodiment of operation S1201, the processor 150 may set the first imaginary line 20 at the center of a driving lane of the vehicle 10 and the second imaginary line 30 at the center of a lane change target lane, and set the lane change start target point 21 on the first imaginary line 20 and the lane change end target point 31 on the second imaginary line 30.

The processor 150 may obtain current position information of the vehicle 10 (S130).

The processor 150 may determine whether the center of the bumper of the vehicle 10 is biased, i.e., the center of the bumper deviates from lane center, in one direction on the first imaginary line 20 on which a lane change start target point is set, based on information related to driving and surrounding images acquired by the sensor 110 and the camera 120 (S140).

In operation S140, if/when the processor 150 determines that the center of the bumper of the vehicle 10 is biased in one direction with respect to the first imaginary line 20 on which the lane change start target point is set, the processor 150 may set at least one new lane change start target point based on the vehicle position.

In operation S140, the processor 150 may instead determine that the center of the bumper of the vehicle 10 is not biased, i.e., the center of the bumper has note deviated from lane center, in one direction with respect to the first imaginary line 20, i.e., the first imaginary line 20 and the center of the bumper of the vehicle 10 coincide with each other. In this case, the processor 150 may generate the lane change path 40 so as to perform the lane change while following the lane change end target point 31 from the lane change start target point 21.

Hereafter, reference is made to FIG. 3 for descriptions related to operations S150 and S160.

According to an embodiment, when the processor 150 determines that the center of the bumper of the vehicle 10 is biased in one direction with respect to the first imaginary line in which the lane change start target point 21 (FIG. 2) is set, the processor 150 may calculate a bias degree, i.e., a deflection degree, and determine whether the bias degree is greater than a reference value (S150). Hereafter, reference is made to FIG. 2 for descriptions related to operations S150 and S160.

According to an embodiment, the processor 150 may calculate the first distance L1 from the first imaginary line 20 of the driving lane to one end of the driving lane. The processor 150 may calculate the second distance L2 from the first imaginary line 20 of the driving lane to the center of the bumper of the vehicle 10. The processor 150 calculate a ratio of the second distance to the first distance as a bias degree. According to an embodiment, the bias degree may be calculated using Equation 1.

In operation S150, according to an embodiment, when the processor 150 determines that the bias degree is not greater than or equal to (i.e., less than) the reference value, the processor 150 may determine that the bias degree of the center of the bumper of the vehicle 10 in one direction is insufficient with respect to the first imaginary line 20 on which the lane change start target point is set and the user would not feel a difference when the steering is performed at the current vehicle position to start the lane change at the lane change start target point 21 of FIG. 2 and when the steering is performed at the current vehicle position to start the lane change at the new lane change start target point 50 of FIG. 3. The processor 150 may perform control such that the lane change is controlled at the preset lane change start target point 21.

In operation S150, according to an embodiment, when it is determined that the bias degree is greater than or equal to the reference value, the processor 150 may set a new lane change start target point based on the bias degree (S160). In operation S160, according to an embodiment, when the processor 150 determines that the user would feel a difference when the steering is performed to start the lane change at the lane change start target point 21 of FIG. 2 and when the steering is performed to start the lane change at the new lane change start target point 50 of FIG. 3, the processor 150 may set a point biased from the center of the driving lane based on a value obtained by multiplying the second distance and the bias degree from the first imaginary line 20 of the driving lane as the new lane change start target point 50.

Although not shown, when the new lane change start target point 50 is set after operation S160, the processor 150 may set the new lane change end target point 51 on a lane change target lane, and generate the lane change path 41 to perform the lane change while following the new lane change end target point 51 from the new lane change start target point 50. According to an embodiment, when the new lane change start target point 50 is set, the processor 150 may output the new lane change start target point 50 through the output device 130 and may also output the lane change path 41 along with the new lane change start target point 60 through the output device 130.

Hereafter, reference is made to FIG. 2 for descriptions related to operations S170 and S180.

According to an embodiment, when the processor 150 determines that the center of the bumper of the vehicle 10 is biased in one direction with respect to the first imaginary line on which the lane change start target point is preset, the processor 150 may calculate an angle between the first imaginary line 20 and a line connecting the bumper (center of the bumper) of the vehicle 10 and the lane change start target point 21 at the current position as a first entry angle $\theta$ and determine whether or not the entry angle $\theta$ is greater than or equal to a pre-stored angle (S170).

In operation S170, the pre-stored angle may be set to an angle at which the user feels a sense of difference when steering is performed to start the lane change at the lane change start target point 21. Accordingly, when the processor 150 determines that the entry angle $\theta$ is equal to or greater than the pre-stored angle, the processor 150 may determine that the user feels a sense of difference when the steering is performed to start the lane change at the lane change start target point 21.

When the entry angle θ is equal to or greater than the pre-stored angle, the processor 150 may move the lane change start target point 21 along the first imaginary line 20 in the driving direction of the vehicle 10 such that the entry angle θ is less than the pre-stored angle and then set the new lane change start target point 60 (S180).

In operation S180, according to an embodiment, the processor 150 may generate the target entry angle θ' by adjusting a distance (L') between the intersection point (P) of a vertical line drawn down from the bumper of the vehicle 10 to the first imaginary line 20 and the new lane change start target point 60. The processor 150 may perform operation such that the target entry angle θ' is less than the pre-stored angle (where θ'<θ).

Although not shown, when the new lane change start target point 60 is set after operation S180, the processor 150 may set the new lane change end target point 61 on a lane change target lane. The processor 150 may generate the lane change path 42 to perform lane change while following the new lane change end target point 61 from the new lane change start target point 60. According to an embodiment, when the new lane change start target point 60 is set, the processor 150 may output the new lane change start target point 60 through the output device 130 and may also output the lane change path 42 along with the new lane change start target point 60 through the output device 130.

Hereafter, reference is made to FIG. 6 for descriptions related to operations S190 and S200.

According to an embodiment, when the processor 150 determines that the center of the bumper of the vehicle 10 is biased in one direction with respect to the first imaginary line on which the lane change start target point is preset, the processor 150 may set the lane change start target point 22 and the lane change end target point 32 with respect to the center of the bumper of the vehicle 10. The processor 150 may do so in the same manner as the method of setting a lane change start target point and a lane change end target point by generating a virtual line on the lane and generate the reference line L4 by connecting the lane change start target point 22 and the lane change end target point 32. The processor 150 may determine whether the distance between the intersection point 70 where the reference line L4 and the first imaginary line 20 meet and the lane change start target point 21 is greater than or equal to a reference distance (S190).

In operation S190, according to an embodiment, when the distance between the lane change start target point 21 and the intersection point 70 is less than the reference distance, the processor 150 may determine that the user would not feel a difference when the steering is performed at the current vehicle position to start the lane change at the lane change start target point 21 and when steering is performed at the current vehicle position to start the lane change at the intersection point 70. The processor 150 may perform control such that the lane change is controlled at the preset lane change start target point 21 without setting a new lane change start target point for lane change.

In operation S190, according to an embodiment, when the distance between the lane change start target point 21 and the intersection point 70 is greater than or equal to the reference distance, the processor 150 may determine that the user would feel a difference when the steering is performed at the current vehicle position to start the lane change at the lane change start target point 21 and when steering is performed at the current vehicle position to start the lane change at the intersection point 70 and set the intersection point 70 as a new lane change start target point for lane change (S200).

Although not shown, when the new lane change start target point 70 is set after operation S2001, the processor 150 may set the new lane change end target point 71 on a lane change target lane, the processor 150 may also generate the lane change path 43 to perform lane change while following the new lane change end target point 71 from the new lane change start target point 70. According to an embodiment, when the new lane change start target point 70 is set, the processor 150 may output the new lane change start target point 70 through the output device 130 and may also output the lane change path 43 along with the new lane change start target point 60 through the output device 130.

When the processor 150 controls moving the vehicle 10 from the current vehicle position to the new lane change start target point (50 in FIG. 3, 60 in FIG. 4, and 70 in FIG. 6), the processor 150 may select a new lane change start target point having the smallest change in steering angle (S210).

When the new lane change start target point having the smallest change in steering angle is selected, the processor 150 may control a lane change based on the selected new lane change start target point (S220).

According to an embodiment, in operations S210-S220, when a new lane change start target point (50 in FIG. 3, 60 in FIG. 4, and 70 in FIG. 6) is set, the processor 150 may output a corresponding lane change path (41 in FIG. 3, 42 in FIG. 4, 43 in FIG. 6) through the output device 130, and allow, i.e., enable, the user to select a lane change path, such as, in one example, from among a plurality of output lane change paths. In addition, when the user selects the lane change path, the processor 150 may control a lane change based on the selected path.

Figure 8:
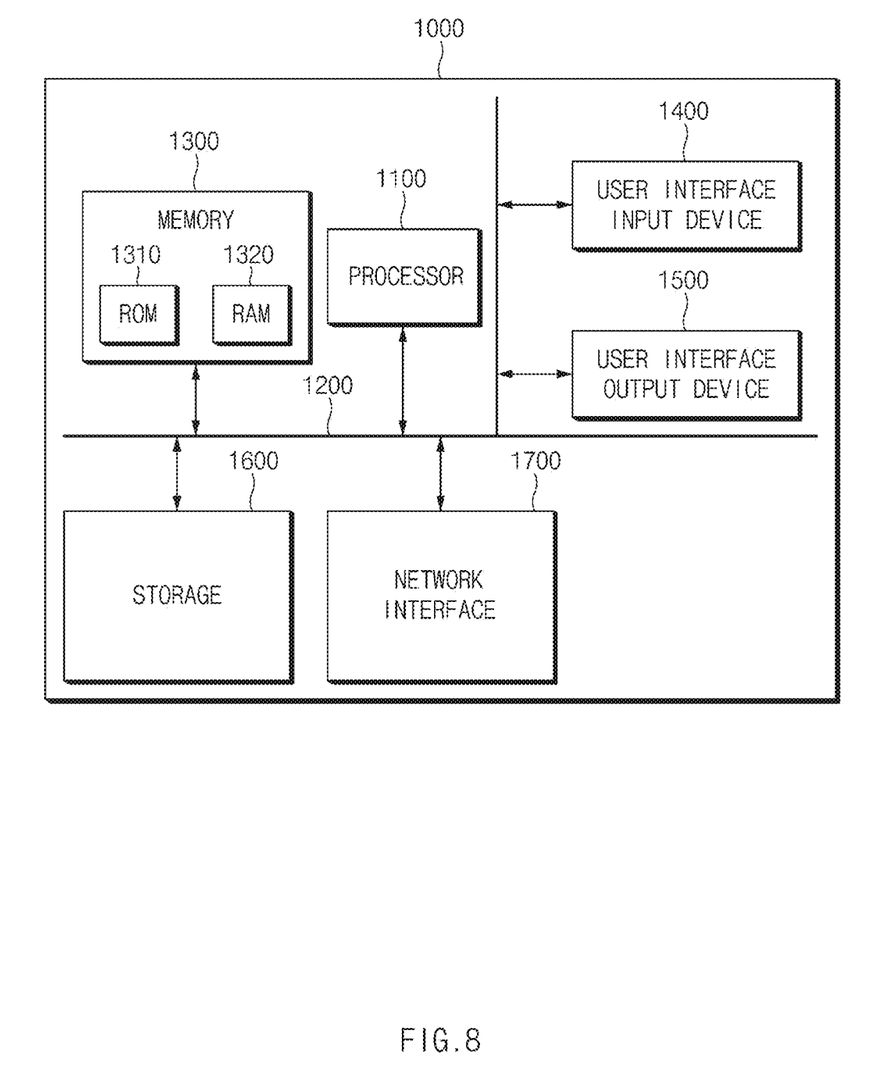
FIG. 8 illustrates a configuration of a computing system for executing a method according to an embodiment of the present disclosure.

FIG. 8 illustrates a configuration of a computing system for executing a method according to an embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure. Various modifications and variations may be made without departing from the essential characteristics of the present disclosure by those of ordinary skill in the art to which the present disclosure pertains.

Accordingly, the embodiments disclosed in the present disclosure are not intended to limit the technical idea of the present disclosure but to describe the present disclosure. The scope of the technical features of the present disclosure is not limited by the disclosed embodiments. The scope of protection of the present disclosure should be interpreted by the following claims. All technical features within the scope equivalent thereto should be construed as being included in the scope of the present disclosure.

The vehicle control apparatus and the method of the embodiments of the present disclosure may reset a lane change start target point based on determining that the degree of bias in one direction from the center of a lane where a vehicle is located is greater than or equal to a reference value.

The vehicle control apparatus and the method of the embodiments of the present disclosure may reset a lane change start target point such that an entry angle is less than a pre-stored angle when an entry angle at which the autonomous vehicle enters a lane change start target point, which is set when the autonomous vehicle is located in the center of the lane, is greater than the pre-stored angle.

The vehicle control apparatus and the method of the embodiments of the present disclosure may reset a lane change start target point based on an intersection point where a reference line connecting a lane change start target point and a lane change end target point generated based on the center of a bumper of an autonomous vehicle and the center of a lane meet.

The vehicle control apparatus and the method of the embodiments of the present disclosure may control a lane change in the lane change situation of an autonomous vehicle by selecting a lane change start target point having the smallest change in steering angle when moving to a reset lane change start target point, thereby controlling the lane change to avoid a sense of difference even when the vehicle is biased in one direction from the center of the lane where the vehicle is located. In other words, the vehicle control apparatus and the method may limit the steering angle to avoid a situation in which an occupant of the vehicle may feel uncomfortable due to the difference in motion that the occupant may feel when steering of the vehicle is performed at a suddenly-increased steering angle.

Hereinabove, although the present disclosure has been described with reference to various embodiments and the accompanying drawings, the present disclosure is not limited thereto. The present disclosure may be variously modified and altered by those of ordinary skill in the art to which the present disclosure pertains without departing from the spirit and scope of the present disclosure claimed in the following claims.

What is claimed is:

1. A vehicle control apparatus comprising:
   one or more sensors configured to obtain information related a vehicle being driven within a driving lane; and
   a processor configured to
      set a lane change start target point with respect to a center of the driving lane, and
      set at least one new lane change start target point based on a position of the vehicle if it is determined that a center of the vehicle is biased in one direction with respect to the center of the driving lane.

2. The vehicle control apparatus of claim 1, wherein the processor is configured to:
   determine a first distance from the center of the driving lane to one end of the driving lane and a second distance from the center of the driving lane to the center of the vehicle;
   determine a ratio of the second distance to the first distance as a bias degree; and
   set a point biased from the center of the driving lane based on the second distance and the bias degree, as the at least one new lane change start target point.

3. The vehicle control apparatus of claim 1, wherein the processor is configured to:
   determine an angle between a line connecting the center of the vehicle and the lane change start target point and an imaginary line set at the center of the driving lane, as an entry angle; and
   if the entry angle is greater than or equal to a pre-stored angle, set the at least one new lane change start target point by moving the lane change start target point along the imaginary line such that the entry angle is less than the pre-stored angle.

4. The vehicle control apparatus of claim 1, wherein the processor is configured to set an intersection point where a reference line connecting the lane change start target point, which is set based on the center of the vehicle and a lane change end target point, and the center of the driving lane meet, as the at least one new lane change start target point.

5. The vehicle control apparatus of claim 1, wherein the processor is configured to select another at least one new lane change start target point having a smallest change in steering angle if the vehicle moves to the at least one new lane change start target point.

6. The vehicle control apparatus of claim 5, wherein the processor is configured to control a lane change based on the selected other at least one new lane change start target point.

7. The vehicle control apparatus of claim 1, wherein the processor is configured to:
   set a lane change end target point at a center of a lane change target lane;
   generate a lane change path following the lane change end target point from the at least one new lane change start target point; and
   control a lane change based on the lane change path.

8. The vehicle control apparatus of claim 7, wherein the processor is configured to perform control to output the at least one new lane change start target point and the lane change path via an output device if the at least one new lane change start target point is set.

9. The vehicle control apparatus of claim 8, wherein the processor is configured to:
   enable a user to select the change lane path from among a plurality of output lane change paths; and
   control the lane change based on the lane change path selected by the user.

10. A vehicle control method comprising:
    setting a lane change start target point with respect to a center of a driving lane; and
    setting at least one new lane change start target point based on a position of a vehicle if it is determined that a center of the vehicle is biased in one direction with respect to the center of the driving lane.

11. The vehicle control method of claim 10, further comprising:
- determining a first distance from the center of the driving lane to one end of the driving lane and a second distance from the center of the driving lane to the center of the vehicle;
- determining a ratio of the second distance to the first distance as a bias degree; and
- setting a point biased from the center of the driving lane based on the second distance and the bias degree, as the at least one new lane change start target point.

12. The vehicle control method of claim 10, further comprising:
- determining an angle between a line connecting the center of the vehicle and the lane change start target point and an imaginary line set at the center of the driving lane, as an entry angle; and
- if the entry angle is greater than or equal to a pre-stored angle, setting the at least one new lane change start target point by moving the lane change start target point along the imaginary line such that the entry angle is less than the pre-stored angle.

13. The vehicle control method of claim 10, further comprising:
- setting an intersection point where a reference line connecting the lane change start target point, which is set based on the center of the vehicle and a lane change end target point, and the center of the driving lane meet, as the at least one new lane change start target point.

14. The vehicle control method of claim 10, further comprising:
- selecting another at least one new lane change start target point having a smallest change in steering angle if the vehicle moves to the at least one new lane change start target point.

15. The vehicle control method of claim 14, further comprising:
- controlling a lane change based on the selected other at least one new lane change start target point.

16. The vehicle control method of claim 10, further comprising:
- setting a lane change end target point at a center of a lane change target lane;
- generating a lane change path following the lane change end target point from the at least one new lane change start target point; and
- controlling a lane change based on the lane change path.

17. The vehicle control method of claim 16, further comprising:
- performing control to output the at least one new lane change start target point and the lane change path via an output device if the at least one new lane change start target point is set.

18. The vehicle control method of claim 17, further comprising:
- enabling a user to select the change lane path from among a plurality of output lane change paths; and
- controlling the lane change based on the lane change path selected by the user.

\* \* \* \* \*